(12) United States Patent
Cheng et al.

(10) Patent No.: US 7,199,944 B2
(45) Date of Patent: Apr. 3, 2007

(54) ZOOM LENS DRIVING APPARATUS

(75) Inventors: Chen-Chin Cheng, Hsinchu (TW); Hsiao-Yue Tsao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/092,697

(22) Filed: Mar. 30, 2005

(65) Prior Publication Data
US 2006/0077577 A1 Apr. 13, 2006

(30) Foreign Application Priority Data
Oct. 11, 2004 (TW) .............................. 93130749 A

(51) Int. Cl.
*G02B 15/14* (2006.01)

(52) U.S. Cl. ........................ 359/699; 359/694; 359/700

(58) Field of Classification Search ................ 359/694, 359/696, 699, 700, 822, 823; 396/72
See application file for complete search history.

(56) References Cited

U.S. PATENT DOCUMENTS

| 4,636,041 A | 1/1987 | Kotaka et al. |
| 4,948,235 A | 8/1990 | Akitake |
| 5,140,468 A | 8/1992 | Kayanuma |
| 5,166,829 A * | 11/1992 | Iizuka ........................ 359/699 |
| 5,298,933 A | 3/1994 | Chigira |
| 5,570,149 A | 10/1996 | Wakabayashi et al. |
| 5,627,683 A | 5/1997 | Takezawa |
| 5,636,062 A | 6/1997 | Okuyama et al. |
| 5,689,739 A | 11/1997 | Yoshida et al. |
| 5,708,535 A | 1/1998 | Orimo et al. |
| 5,790,908 A | 8/1998 | Matsuda |
| 6,031,998 A | 2/2000 | Shono |

* cited by examiner

*Primary Examiner*—Hung Xuan Dang
*Assistant Examiner*—Joseph Martinez
(74) *Attorney, Agent, or Firm*—Rabin & Berdo, P.C.

(57) ABSTRACT

A zoom lens driving apparatus achieves the object of driving multiple lens groups by a single motor and low production cost. When a first lens group, which includes a first lens, moves along guide rods, a leading cam of a leading member drives a leading pin of a follower, so that the follower moves a guide pin, and moves a second lens group, which includes a second lens, along the guide rods. The relative distance between the first lens group and the second lens group is controlled by the leading cam.

21 Claims, 3 Drawing Sheets

ZOOM LENS DRIVING APPARATUS

FIELD OF THE INVENTION

The invention generally relates to an apparatus for driving lens groups, and in particular relates to a single-motor apparatus for driving zoom lens groups.

BACKGROUND OF THE INVENTION

Generally, high ratio zoom lens use more than four optical lens groups, and at least two groups are movable. Because of the two moving groups, the design limitation of zoom lenses is severer, the optical design is more difficult, and the optical quality is hard to improve. On the other hand, though using more than two moving lens groups in the zoom lens may improve the freedom of optical design and improve the optical quality, it actually also adds the difficulty and cost of mechanical design. Conventional four-lens-group zoom lens with two moving groups uses two motors to drive a zooming lens group and a focus lens group respectively. Conventional four-lens-group zoom lens with three moving groups uses a cylindrical cam to move two zooming lens groups, and a motor to drive the focus lens group. The above mechanisms are complicated, the component fabrications are difficult and the costs are high.

Different kinds of zoom lenses are disclosed in U.S. Pat. Nos. 4,636,041, 4,948,235, 5,140,468, 5,298,933, 5,570,149, 5,627,683, 5,636,062, 5,689,739, 5,708,535, 5,790,908 and 6,031,998. A part of them are technically reviewed as follows.

U.S. Pat. No. 5,140,468 discloses a zoom lens of four lens groups, in which three groups are movable. Two planar cams driven by two motors control the relative positions of the three moving lens groups. Because the moving directions of the planar cams are perpendicular to the optical axis, they occupy much space and are hard to be miniaturized.

U.S. Pat. No. 5,298,933 discloses a zoom lens of four lens groups, in which the first group and the third group are fixed groups; the second group and the fourth group are moving groups respectively driven by a motor. It has advantages of simple structure and low cost. However, the second group and the fourth group use different rails, and the optical design is also strict.

U.S. Pat. No. 5,627,683 discloses a zoom lens of four lens groups that are all moving groups. Each moving group is actuated by a cam ring or a thread ring, the mechanism is complicated and costs high.

U.S. Pat. No. 5,636,062 discloses a zoom lens of four lens groups. It uses a crank member to drive two lens groups.

U.S. Pat. No. 5,689,739 discloses a zoom lens of four lens groups. It uses a specific drive mechanism including a cam lever and two cam pins. The drive mechanism is hard to be miniaturized.

U.S. Pat. No. 5,708,535 discloses a zoom lens of four lens groups, in which the first group and the third group are fixed groups; the second group and the fourth group are moving groups respectively driven by a motor. It has advantages of simple structure and low cost. However, the second group and the fourth group use different rails.

U.S. Pat. No. 6,031,998 discloses a zoom lens of four lens groups, in which the actuator is a cylinder. The guide rail in the cylinder is not easy to be made.

SUMMARY OF THE INVENTION

In view of the aforesaid problems, the object of the invention is to provide a lens driving apparatus that drives multiple lens groups by a single motor and achieves low production cost, high freedom of optical design and high optical quality. By using a linkage, a motor driving a first lens group also drives a second lens group, and even a third lens group. The relative distances between the second lens group and the first lens group, and between the third lens group and the first lens group are controllable. Thus the invention is applicable to a zoom lens of four lens groups that uses more than two moving lens groups.

To achieve the aforesaid object, a zoom lens driving apparatus of the invention includes a first lens group, a second lens group, guide rods, a guide pin, a follower and a leading member. The first lens group includes a first lens. The second lens group includes a second lens. The guide rods pass through the first lens group and the second lens group to let the first lens group and the second lens group movable along the guide rods. The guide pin is formed on the second lens group. The follower is formed with a leading pin and a guide slot corresponding to the guide pin on the second lens group. The leading member has an end fixed to the first lens group, and is formed with a leading cam corresponding to the leading pin. When the first lens group moves along the guide rods, the leading cam of the leading member drives the leading pin of the follower, so that the follower pushes the guide pin, and moves the second lens group along the guide rod. The leading cam controls the relative distance between the first lens group and the second lens group. Therefore, the invention achieves the object of driving multiple lens groups by a single motor and low production cost.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
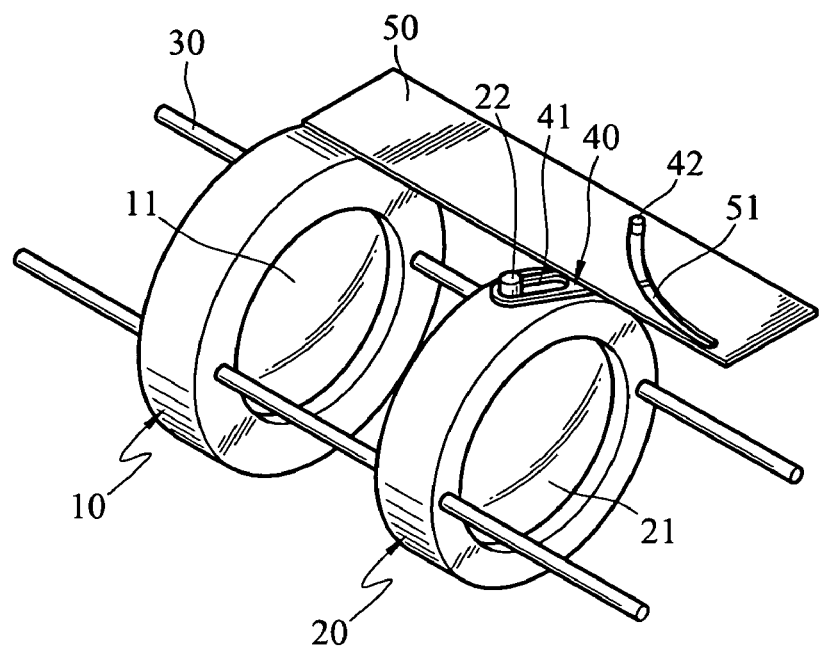
FIG. 1 is a perspective view of a first embodiment of the invention.

As shown in FIG. 1, a first embodiment of the invention, the zoom lens driving apparatus includes a first lens group 10, a second lens group 20, guide rods 30 and 35, a guide pin 22, a follower 40 and a leading member 50. The first lens group 10 includes a first lens 11. The second lens group 20 includes a second lens 21. The guide rods 30 and 35 pass through the first lens group 10 and the second lens group 20 to let the first lens group 10 and the second lens group 20 move along the guide rods 30 and 35. The guide pin 22 is formed on the second lens group 20. The follower 40 is formed with a leading pin 42 and a guide slot 41 corresponding to the guide pin 22. The leading member 50 has one end fixed to the first lens group 10, and a leading cam 51 corresponding to the leading pin 42. The leading cam 51 is a slot.

In operation, a motor (not shown) drives the first lens group 10 to move along the guide rods 30 and 35. The leading cam 51 of the leading member 50 pushes the leading pin 42 of the follower 40. The follower 40 is pivoted with a pin to a lens barrel (not shown) and rotates to move the guide pin 22 to cause the second lens group 20 to move along the guide rods 30 and 35. The relative distance between the first lens group 10 and the second lens group 20 changes according to the leading cam 51. Therefore, the first embodiment of the invention achieves the object of low production cost, high freedom of optical design and high optical quality with a single motor to drive two lens groups. Certainly, in the first embodiment, the guide pin 22 and the guide slot 41 can be interchanged. That means the guide pin 22 is formed on the follower 40 and the guide slot 41 is formed on the second lens group 20 to attain the same movement.

Figure 2:
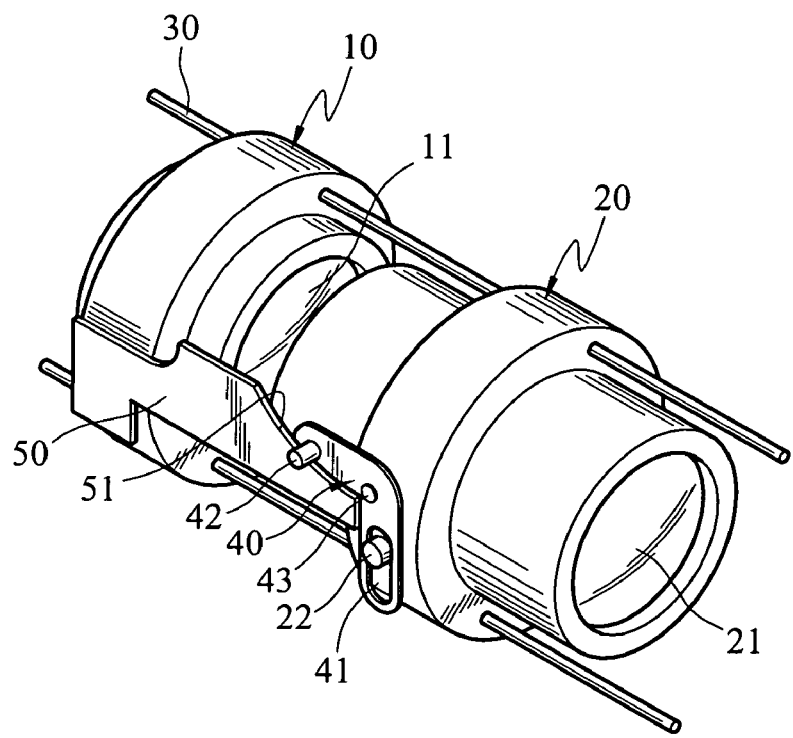
FIG. 2 is a perspective view of a second embodiment of the invention.

As shown in FIG. 2, a second embodiment of the invention, the zoom lens driving apparatus includes a first lens group 10, a second lens group 20, guide rods 30 and 35, a guide pin 22, a follower 40 and a leading member 50. The first lens group 10 includes a first lens 11. The second lens group 20 includes a second lens 21. The guide rods 30 and 35 pass through the first lens group 10 and the second lens group 20 to let the first lens group 10 and the second lens group 20 move along the guide rods 30 and 35. The guide pin 22 is formed on the second lens group 20. The follower 40 is formed with a leading pin 42 and a guide slot 41 corresponding to guide pin 22. The leading member 50 has one end fixed to the first lens group 10, and a leading cam slot 51 corresponding to the leading pin 42 on the follower. The leading cam 51 is a flat cam.

In operation, a motor (not shown) drives the first lens group 10 moving along the guide rods 30 and 35. The leading cam 51 of the leading member 50 moves the leading pin 42 of the follower 40. The follower 40 is pivoted with a pin via a hole 43 to a lens barrel (not shown) and revolves to move the guide pin 22 to cause the second lens group 20 moving along the guide rods 30 and 35. The relative distance between the first lens group 10 and the second lens group 20 changes according to the leading cam 51. Therefore, the second embodiment of the invention achieves the object of driving multiple lens groups by a single motor and low production cost. Certainly, in the second embodiment, the guide pin 22 and the guide slot 41 can be interchanged, that means the guide pin 22 is formed on the follower 40 and the guide slot 41 is formed on the second lens group 20 to attain the same movement.

Figure 3:
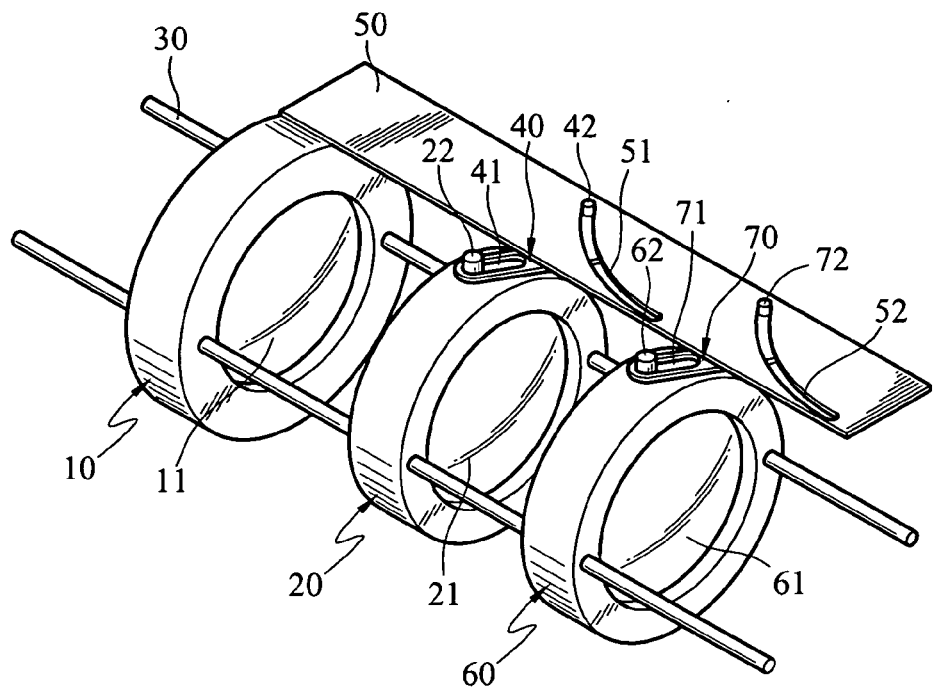
FIG. 3 is a perspective view of a third embodiment of the invention.

As shown in FIG. 3, a third embodiment of the invention, the zoom lens driving apparatus further includes a third lens group 60 having a third lens 61. Another guide pin 62 is formed on the third lens group 60. Another follower 70 is formed with another leading pin 72 and another guide slot 71 corresponding to the guide pin 62 on the third group. The leading member 50 has another leading cam 52 corresponding to the leading pin 72. The leading cam 52 is a slot.

In operation, a motor (not shown) drives the first lens group 10 moving along the guide rods 30 and 35. The leading cam 51 of the leading member 50 pushes the leading pin 42 of the follower 40. The follower 40 is pivoted on a lens barrel (not shown) and rotates to push the guide pin 22 to cause the second lens group 20 moving along the guide rods 30 and 35. The relative distance between the first lens group 10 and the second lens group 20 changes according to the leading cam slot 51. Meanwhile, the first lens group 10 also causes the third lens group 60 moving along the guide rods 30 and 35. The relative distance between the first lens group 10 and the third lens group 60 changes according to the leading cam slot 52. Therefore, the second embodiment of the invention achieves the object of driving multiple lens groups by a single motor and low production cost.

Figure 4:
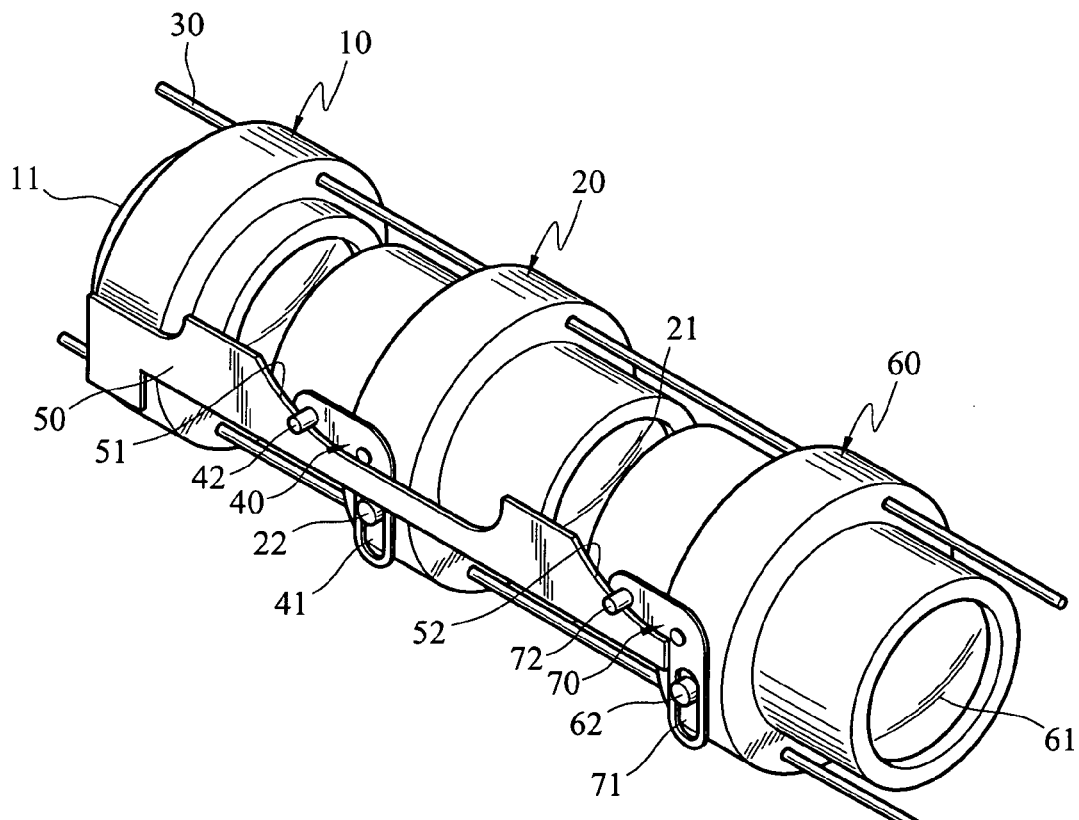
FIG. 4 is a perspective view of a fourth embodiment of the invention.

As shown in FIG. 4, a fourth embodiment of the invention, the leading cam 52 is a flat cam. Certainly, in the third or fourth embodiments, the guide pin 22 and the guide slot 41 can be interchanged, that means the guide pin 22 is formed on the follower 40, the guide slot 41 is formed on the second lens group 20, the guide pin 62 is formed on the follower 70 and the guide slot 71 is formed on the follower 70 to attain the same movement.

Figure 5:
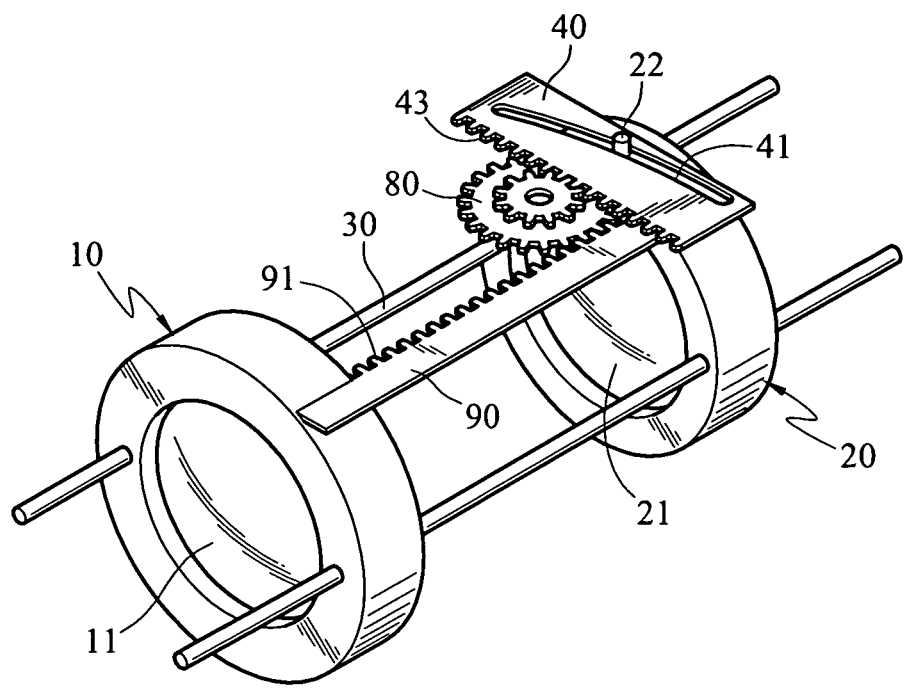
FIG. 5 is a perspective view of a fifth embodiment of the invention.

As shown in FIG. 5, a fifth embodiment of the invention, the lens driving apparatus includes a first lens group 10, a second lens group 20, guide rods 30 and 35, a guide pin 22, a follower 40, a gear cluster 80 and a rack 90. The first lens group 10 includes a first lens 11, the second lens group 20 includes a second lens 21. The guide rods 30 and 35 pass through the first lens group 10 and the second lens group 20 to let the first lens group 10 and the second lens group 20 movable along the guide rods 30 and 35. The guide pin 22 is formed on the second lens group 20. The follower 40 is formed with a guide slot 41 corresponding to the guide pin 22, and a leading rack 43 engaged with the gear cluster 80. One end of the rack 90 is fixed to the first lens group 10, and has a plurality of teeth 91 engaged with the gear cluster 80.

In operation, a motor (not shown) drives the first lens group 10 moving along the guide rods 30 and 35. The plurality of teeth 91 of the rack 90 revolves the gear cluster 80. The gear cluster 80 moves the leading rack 43 of the follower 40 and pushes the guide pin 22 via the guide slot 41 to cause the second lens group 20 moving along the guide rods 30 and 35. The relative distance between the first lens group 10 and the second lens group 20 changes according to the guide slot 41. Therefore, the fifth embodiment of the invention achieves the object of driving multiple lens groups by a single motor and low production cost. Certainly, in the fifth embodiment, the guide pin 22 and the guide slot 41 can be interchanged, that means setting the guide pin 22 on the follower 40 and setting the guide slot 41 on the second lens group 20 to attain the same movement.

Figure 6:
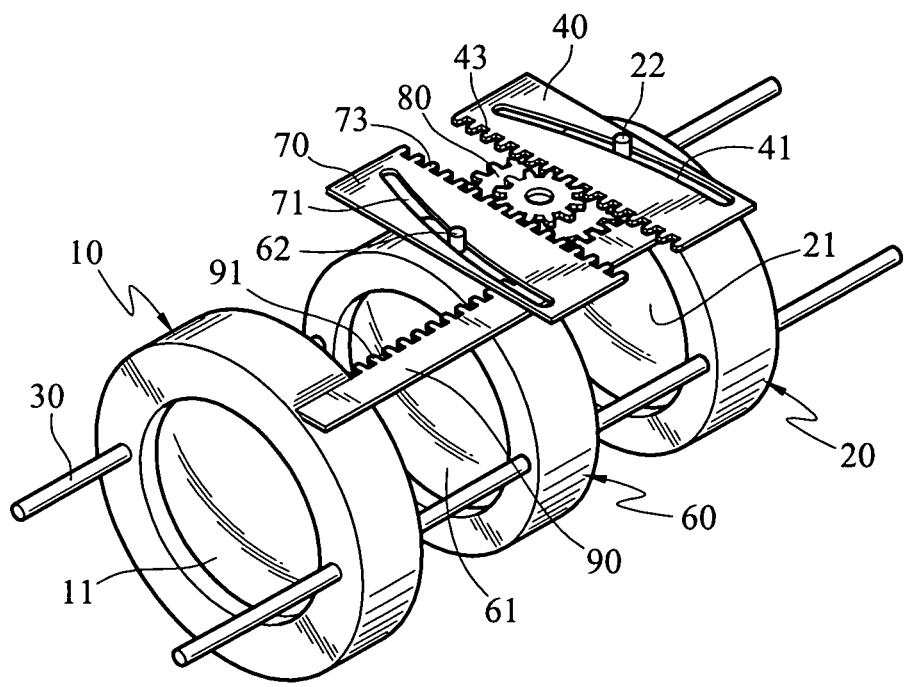
FIG. 6 is a perspective view of a sixth embodiment of the invention.

As shown in FIG. 6, a sixth embodiment of the invention, the zoom lens driving apparatus further includes a third lens group 60 having a third lens 61. Another guide pin 62 is formed on the third lens group 60. Another follower 70 is formed with a guide slot 71 corresponding to the guide pin 62, and teeth 73 engaged with the gear cluster 80. Thus the first lens group 10 also causes the third lens group 60 moving along the guide rods 30 and 35. The relative distance between the first lens group 10 and the third lens group 60 changes according to the guide slot 71.

In operation, a motor (not shown) drives the first lens group 10 moving along the guide rods 30 and 35. The plurality of teeth 91 of the rack 90 revolves the gear cluster 80. The gear cluster 80 moves the rack 43 of the follower 40 and pushes the guide pin 22 via the guide slot 41 to cause the second lens group 20 moving along the guide rods 30 and 35. The relative distance between the first lens group 10 and the second lens group 20 changes according to the guide slot 41. Meanwhile, the first lens group 10 also causes the third lens group 60 moving along the guide rods 30 and 35. The relative distance between the first lens group 10 and the third lens group 60 changes according to the guide slot 71.

Therefore, the sixth embodiment of the invention achieves the object. Certainly, in the sixth embodiment, the guide pin 22 and the guide slot 41 can be interchanged, that means the guide pin 22 is formed on the follower 40, the guide slot 41 is formed on the second lens group 20, the guide pin 62 is formed on the follower 70 and the guide slot 71 is formed on the follower 70 to attain the same movement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens driving apparatus, comprising:
   a movable first lens group, having a first lens;
   a second lens group, having a second lens;
   at least two guide rods, passing through said first lens group and said second lens group to let said first lens group and said second lens group move relative to each other along said guide rods;
   a guide pin, formed on said second lens group;
   a follower, having a leading pin disposed thereon, and a guide slot formed therein, said guide pin penetrating the guide slot; and
   a leading member, having a first end fixed to said first lens group, and having a second end that has a leading cam, the leading cam engaging with said leading pin of said follower;
   wherein when said first lens group moves along said guide rods, said leading member and said leading cam are caused to move in a linear direction, causing said leading cam of said leading member to moves said leading pin of said follower, and thereby causing said follower to move said guide pin, thereby moving said second lens group along said guide rods, with a relative distance between said first lens group and said second lens group changing according to said leading cam.

2. The lens driving apparatus of claim 1, wherein said leading cam is a slot.

3. The lens driving apparatus of claim 1, wherein said leading cam is a flat cam.

4. The lens driving apparatus of claim 1, further comprises a third lens group having a third lens, another guide pin is formed on said third lens group, another follower formed with another leading pin and another guide slot corresponding to said another guide pin, said leading member has another leading cam corresponding to said another leading pin, therefore, said first lens group also causes said third lens group moving along said guide rods, a relative distance between said first lens group and said third lens group changes according to said another leading cam.

5. The lens driving apparatus of claim 4, wherein said another leading cam is a slot.

6. The lens driving apparatus of claim 4, wherein said another leading cam is a flat cam.

7. The lens driving apparatus of claim 1, further comprises a third lens group having a third lens, another guide slot is formed on said third lens group, another follower formed with another leading pin and another guide pin corresponding to said another guide slot, said leading member has another leading cam corresponding to said another leading pin, therefore, said first lens group also causes said third lens group moving along said guide rods, a relative distance between said first lens group and said third lens group changes according to said another leading cam.

8. The lens driving apparatus of claim 7, wherein said another leading cam is a slot.

9. The lens driving apparatus of claim 7, wherein said another leading cam is a flat cam.

10. The lens driving apparatus of claim 1, wherein said leading member protrudes away from said first lens group.

11. The lens driving apparatus of claim 1, wherein the leading cam is the only cam of the apparatus.

12. A lens driving apparatus, comprising:
    a movable first lens group, having a first lens;
    a second lens group, having a second lens;
    at least two guide rods, passing through said first lens group and said second lens group to let said first lens group and said second lens group move relative to each other along said guide rods;
    a guide slot, formed on said second lens group;
    a follower, having both a leading pin and a guide pin disposed thereon, said guide pin penetrating said guide slot; and
    a leading member, having a first end fixed to said first lens group, and having a second end that has a leading cam, the leading cam engaging with said leading pin of said follower;
    wherein when said first lens group moves along said guide rods, said leading member and said leading cam are caused to move in a linear direction, causing said leading cam of said leading member to moves said leading pin of said follower, and thereby causing said follower to moves said guide pin, thereby moving said second lens group along said guide rods, with a relative distance between said first lens group and said second lens group changing according to said leading cam.

13. The lens driving apparatus of claim 12, wherein said leading cam is a slot.

14. The lens driving apparatus of claim 12, wherein said leading cam is a flat cam.

15. The lens driving apparatus of claim 12, further comprises a third lens group having a third lens, another guide pin is formed on said third lens group, another follower formed with another leading pin and another guide slot corresponding to said another guide pin, said leading member has another leading cam corresponding to said another leading pin, therefore, said first lens group also causes said third lens group moving along said guide rods, a relative distance between said first lens group and said third lens group changes according to said another leading cam.

16. The lens driving apparatus of claim 15, wherein said another leading cam is a slot.

17. The lens driving apparatus of claim 15, wherein said another leading cam is a flat cam.

18. The lens driving apparatus of claim 12, further comprises a third lens group having a third lens, another guide slot is formed on said third lens group, another follower formed with another leading pin and another guide pin corresponding to said another guide slot, said leading member has another leading cam corresponding to said another leading pin, therefore, said first lens group also causes said third lens group moving along said guide rods, a relative distance between said first lens group and said third lens group changes according to said another leading cam.

19. The lens driving apparatus of claim 18, wherein said another leading cam is a slot.

20. The lens driving apparatus of claim 18, wherein said another leading cam is a flat cam.

21. The lens driving apparatus of claim 12, wherein said leading member protrudes away from said first lens group.

* * * * *